US011881369B2

(12) United States Patent
Hofsaess

(10) Patent No.: US 11,881,369 B2
(45) **Date of Patent: *Jan. 23, 2024**

(54) TEMPERATURE-DEPENDENT SWITCH

(71) Applicant: Marcel P. Hofsaess, Steintahleben (DE)

(72) Inventor: Marcel P. Hofsaess, Steintahleben (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,348

(22) Filed: Jan. 25, 2023

(65) Prior Publication Data

US 2023/0162934 A1 May 25, 2023

Related U.S. Application Data

(62) Division of application No. 17/074,033, filed on Oct. 19, 2020, now Pat. No. 11,749,479.

(30) Foreign Application Priority Data

Oct. 21, 2019 (DE) ..................... 10 2019 128 367.1

(51) Int. Cl.
*H01H 37/00* (2006.01)
*H01H 37/54* (2006.01)
*H01H 37/52* (2006.01)

(52) U.S. Cl.
CPC ...... *H01H 37/5409* (2013.01); *H01H 37/002* (2013.01); *H01H 37/52* (2013.01); *H01H 2037/549* (2013.01)

(58) Field of Classification Search
CPC .. H01H 37/5409; H01H 37/002; H01H 37/52; H01H 2037/549
USPC .......................................................... 337/348
See application file for complete search history.

(56) References Cited

U.S. PATENT DOCUMENTS 2,361,193 A 10/1944 Gray
4,053,859 A 10/1977 Hollweck
4,554,525 A 11/1985 Bayer
4,646,054 A 2/1987 Bayer
(Continued)

FOREIGN PATENT DOCUMENTS

CN 1697910 A 11/2005
CN 101536130 A 9/2009
(Continued)

*Primary Examiner* — Anatoly Vortman
(74) *Attorney, Agent, or Firm* — REISING ETHINGTON P.C.

(57) ABSTRACT

A temperature-dependent switch comprising first and second stationary contacts and a temperature-dependent switching mechanism having a movable contact member. The switching mechanism, in its first switching position, presses the contact member against the first contact and thereby produces an electrically conductive connection and, in its second switching position, keeps the contact member spaced apart from the first contact and thereby disconnects the electrically conductive connection. The switch further comprises a closing lock that, as soon as it is activated, prevents the switch once having opened from closing again. The closing lock comprises a locking element having a shape-memory alloy and an opening through which the movable contact member protrudes. The locking element is configured to change its shape upon exceeding a locking element switching temperature and activate the closing lock, which holds the switching mechanism in its second switching position.

14 Claims, 8 Drawing Sheets

(56) References Cited

U.S. PATENT DOCUMENTS

| | | | | |
|---|---|---|---|---|
| 5,235,308 | A | 8/1993 | Shimada et al. | |
| 5,497,286 | A | 3/1996 | Shimada et al. | |
| 5,828,286 | A * | 10/1998 | Hofsass | H01H 37/5427 337/380 |
| 5,973,587 | A * | 10/1999 | Hofsass | H01H 1/504 337/377 |
| 6,091,315 | A | 7/2000 | Hofsaess | |
| 6,100,784 | A * | 8/2000 | Hofsass | H01H 11/0056 337/333 |
| 6,191,680 | B1 | 2/2001 | Hofsaess | |
| 6,580,351 | B2 | 6/2003 | Davis | |
| 6,741,159 | B1 | 5/2004 | Kuczynski | |
| 7,071,809 | B2 | 7/2006 | Davis et al. | |
| 7,209,336 | B2 | 4/2007 | Yu | |
| 7,345,568 | B2 | 3/2008 | Yu | |
| 7,380,843 | B2 | 6/2008 | Alacqua et al. | |
| 9,355,801 | B2 | 5/2016 | Hofsaess | |
| 10,861,662 | B2 | 12/2020 | Hofsaess | |
| 11,217,409 | B2 | 1/2022 | Hofsaess | |
| 11,264,194 | B2 | 3/2022 | Hofsaess | |
| 11,469,066 | B2 * | 10/2022 | Hofsaess | H01H 37/64 |
| 2002/0003465 | A1 * | 1/2002 | Takeda | H01H 37/5427 337/298 |
| 2014/0225709 | A1 | 8/2014 | Kirch et al. | |
| 2019/0221390 | A1 | 7/2019 | Hofsaess | |

FOREIGN PATENT DOCUMENTS

| | | | |
|---|---|---|---|
| CN | 103562478 | A | 2/2014 |
| CN | 103985599 | A | 8/2014 |
| CN | 207338282 | U | 5/2018 |
| DE | 932028 | C | 8/1955 |
| DE | 2544201 | A1 | 4/1977 |
| DE | 8625999 | U1 | 11/1986 |
| DE | 19636640 | A1 | 3/1998 |
| DE | 102007042188 | B3 | 4/2009 |
| DE | 102013101392 | A1 | 8/2014 |
| DE | 102018100890 | B3 | 7/2019 |
| EP | 0041823 | A1 | 12/1981 |
| EP | 0828273 | A2 | 3/1998 |
| EP | 2254138 | A2 | 11/2010 |
| JP | H02244528 | A | 9/1990 |
| JP | H09213182 | A | 8/1997 |

* cited by examiner

TEMPERATURE-DEPENDENT SWITCH

CROSS REFERENCE TO RELATED APPLICATIONS

This application is a divisional of U.S. patent application Ser. No. 17/074,033 filed Oct. 19, 2020, which claims priority from German patent application DE 10 2019 128 367.1, filed on Oct. 21, 2019. The entire contents of both of these applications are incorporated herein by reference.

BACKGROUND

This disclosure relates to a temperature-dependent switch.

An exemplary temperature-dependent switch is disclosed in DE 10 2018 100 890 B3.

Such temperature-dependent switches are usually used for the purpose of protecting electrical devices from overheating. To this end, the switch is connected in series to the device to be protected and to the supply voltage thereof and is arranged mechanically on the device such that it is thermally connected to said device.

A temperature-dependent switching mechanism ensures that the two stationary contacts of the switch are electrically connected to each other below the response temperature of the switching mechanism. Hence, the circuit is closed below the response temperature and the load current of the device to be protected can flow through the switch.

If the temperature rises above an admissible value, the switching mechanism lifts off the movable contact member from the counter contact, opening the switch and disconnecting the load current of the device to be protected. The now current-less device can then cool down again. In this case, the switch, which is coupled thermally to the device, also cools down and would thereupon actually close again automatically.

However, in the case of the switch disclosed in DE 10 2018 100 890 B3, a closing lock ensures that this switching back does not occur in the cooled-down position, so that the device to be protected, once being switched off, cannot switch itself on again automatically. The closing lock mechanically locks the switching mechanism, so that the switching mechanism, once been opened, cannot close again, even if strong vibrations or temperature fluctuations occur.

This is a safety function that applies, for example, to electric motors that are used as drive units. This is intended in particular to prevent damage to the device or even injury to the person using the device.

Due to their switching behavior, such switches, which do not close again after being opened once, are also called one-time switches.

It goes without saying that "opening" the switch means the disconnection of the electrically conductive connection between the two contacts of the switch and not an opening of the switch housing in the mechanical sense.

A further switch of this type is disclosed in DE 10 2013 101 392 A1. This switch comprises a temperature-dependent switching mechanism having a temperature-dependent bimetal snap-action disc and a bistable spring disc which carries a movable contact or a current transfer member. When the bimetal snap-action disc is heated to a temperature above its response temperature, it lifts off the contact or the current transfer member from the counter contact or counter contacts against the force of the spring disc and thereby presses the spring disc into its second stable configuration in which the switching mechanism is situated in its high-temperature position.

When the switch and thus the bimetal snap-action disc cool down again, said bimetal snap-action disc returns to its low-temperature position. However, due its design, its edge cannot rest on a counter bearing, such that the spring disc remains in the stable second configuration in which the switch is open.

This means that the switch remains in its open position after opening once, even if it cools down again. However, tests carried out by the company of the applicant have shown that the switch disclosed in DE 10 2013 101 392 A1 does close again in the event of stronger mechanical vibrations such that—under safety aspects—it may not be the perfect solution in some applications.

There are also temperature-dependent switches with a so-called self-holding resistor which is connected in parallel with the two counter contacts so that it takes over part of the load current when the switch opens. Ohmic heat, which is sufficient to hold the snap-action disc above its response temperature, is generated in said self-holding resistor.

However, this so-called self-holding is only active for as long as the electric device is still switched on. As soon as the device is shut off from the supply circuit, no more current flows through the temperature-dependent switch either so that the self-holding function is cancelled. After the electric device has been switched on again, the switch would therefore be situated in the closed state again so that the device is able to heat up again, which could result in consequential damage.

This problem is avoided with the switches disclosed in DE 10 2007 042 188 B3 and DE 10 2013 101 392 A1, where the self-holding function is not realized electrically, but by means of a bistable spring part, which has two stable geometric configurations in a temperature-independent manner, as is described in the above-cited documents.

In contrast to this, the snap-action disc is a bistable snap-action disc that assumes either a high-temperature configuration or a low-temperature configuration in a temperature-dependent manner.

In the DE 10 2007 042 188 B3 mentioned at the outset, the spring disc is a circular snap-action spring disc on the middle of which the contact member is fastened. The contact member is, for example, a movable contact part which is pressed by the snap-action spring disc against the first stationary contact which is arranged on the inside of a cover of the housing of the switch. The snap-action spring disc presses by way of its edge against an inner bottom of a lower part of the housing which acts as a second contact. In this way, the snap-action spring disc, which is itself electrically conducting, produces an electrically conducting connection between the two counter contacts.

In its low-temperature position, the bimetal snap-action disc lies loosely against the contact part. If the temperature of the bimetal snap-action disc increases, it switches to its high-temperature position, in which it presses with its edge against the inside of the upper part of the housing and, concurrently with its center onto the snap-action spring disc such that said snap-action spring disc switches from its first to its second stable configuration, as a result of which the movable contact part is lifted off from the stationary contact and the switch is opened.

If the temperature of the switch cools down again, the bimetal snap-action disc switches back to its low-temperature position again. In this case, it moves with its edge into abutment with the edge of the snap-action spring disc and with its center into abutment with the upper part of the housing. However, the actuating force of the bimetal snap-action disc is not sufficient to let the snap-action spring disc switch back into its first configuration again.

The bimetal snap-action disc only bends further once the switch has cooled down a lot such that it is finally able to press the edge of the snap-action spring disc onto the inner bottom of the lower part by such a distance that the snap-action spring disc switches into its first configuration again and closes the switch again.

The switch disclosed in DE 10 2007 042 188 B3 therefore, after being opened once, remains open until it has cooled down to a temperature below room temperature, for which purpose a cooling spray can be used, for example.

Although said switch meets the corresponding safety requirements in many applications, it has nevertheless been shown that as a result of bracing the bi-metal snap-action disc between the upper part of the housing and the edge of the snap-action spring disc, in rare cases the snap-action spring disc nevertheless springs back in an unwanted manner.

DE 10 2013 101 392 A1 discloses a switch having a current transfer member as a movable contact member, for example in the form of a contact plate supported by the snap-action spring disc. Both stationary contacts are now arranged on the inner surface of the cover of the housing, wherein an electrically conductive connection between these two contacts is produced by placing the contact plate against these two contacts.

In the case of said switch, the snap-action spring disc is fixed with its edge on the lower part of the housing, while the bimetal snap-action disc is provided between the snap-action spring disc and the inner bottom of the lower part.

Below the response temperature of the bimetal snap-action disc, the snap-action spring disc presses the contact plate against the two stationary contacts. If the bimetal snap-action disc switches to its high-temperature position, it presses with its edge against the snap-action spring disc and pulls with its center the snap-action spring disc away from the upper part, so that the contact plate moves out of abutment with the two counter contacts. In order to make this geometrically possible, the contact plate, the snap-action spring disc and the bimetal snap-action disc are captively connected to each other by a centrally extending rivet.

When the temperature of the bimetal snap-action disc drops again, it switches back into its low-temperature position, but the spring disc remains in its assumed configuration as the bimetal snap-action disc lacks a counter bearing for its edge so that it is not able to press the current transfer member against the two stationary contacts again.

Said switch therefore comprises a self-holding function due to the design. In rare cases, in the event of strong mechanical vibrations, the snap-action spring disc can spring back unintentionally here too.

Further, DE 25 44 201 A1 discloses a temperature-dependent switch having a current transfer member realized as a contact bridge, where the contact bridge is pressed against two stationary counter contacts via a closing spring. The contact bridge is in contact via an actuating bolt with a temperature-dependent switching mechanism which consists of a bimetal snap-action disc and a spring disc, both of which are clamped at their edges.

As with the switch disclosed in DE 10 2007 042 188 B3, the spring disc and the bimetal snap-action disc are both bistable, the bimetal snap-action disc in a temperature-dependent manner and the spring disc in a temperature-independent manner.

If the temperature of the bimetal snap-action disc increases, it presses the spring disc into its second configuration, in which it presses the actuating bolt against the contact bridge, lifting it off the stationary counter contacts against the force of the closing spring.

Even when the bimetal snap-action disc cools down, the spring disc remains in said second configuration and keeps the switch open against the force of the closing spring.

Pressure can then be exerted onto the contact bridge from outside by means of a button such that, as a result, the spring disc is pressed back into its first stable configuration by means of the actuating bolt.

Along with the very complex design, said switch, on the one hand, comprises the disadvantage that in the open state, the spring disc lifts the contact bridge from the counter contacts against the force of the closing spring so that the spring disc, in its second configuration, has to overcome the force of the closing spring in a reliable manner. Because the closing spring, however, in the closed state ensures the secure abutment of the contact bridge against the counter contacts, a spring disc with a very high degree of stability is required here in the second configuration.

A further switch with three switching positions is disclosed in DE 86 25 999 U1. It comprises a flexible tongue, which is clamped-in at one end and carries a movable contact part at its free end, wherein the movable contact part interacts with a fixed counter contact.

A calotte is formed on said flexible tongue, which calotte is pressed into its second configuration, in which it distances the movable contact part from the stationary counter contact, by means of a bimetal plate which is also attached to the flexible tongue.

In the case of said switch, the calotte has to hold the movable contact part at a distance from the fixed counter contact against the closing force of the flexible tongue which is clamped-in at one end so that the calotte has to apply a high actuating force in its second configuration.

The switch consequently comprises the above-discussed disadvantages, namely that high actuating forces have to be overcome, which leads to high production costs and to a non-secure state in the cooled-down position.

The switch disclosed in DE 10 2018 100 890 B3, which was mentioned at the outset, has the mechanically most stable closing lock compared to the other mentioned switches. Due to the mechanical locking of the switching mechanism, which is produced by the closing lock, an accidental switch back after the switch has been open once is almost impossible.

It has been shown, however, that the closing lock disclosed in DE 10 2018 100 890 B3 is relatively complex to manufacture, so that the manufacturing costs of the switch are comparatively high.

SUMMARY

It is an object to provide a switch with an alternative closing lock which is simple and thus inexpensive to manufacture and yet still guarantees a safe disconnection of the electric circuit even in the cooled-down position of the switch and in the event of strong vibrations.

According to a first aspect, a temperature-dependent switch is provided, which comprises a first stationary contact, a second stationary contact, and a temperature-dependent switching mechanism having a movable contact member, wherein in a first switching position, the switching mechanism presses the movable contact member against the first stationary contact, thereby producing an electrically conductive connection between the first stationary contact and the second stationary contact via the movable contact member, and, in a second switching position, the switching mechanism keeps the movable contact member spaced at a distance from the first stationary contact, thereby disconnecting the electrically conductive connection, wherein the temperature-dependent switching mechanism comprises a temperature-dependent snap-action part, which is configured to switch from a geometric low-temperature configuration to a geometric high-temperature configuration upon reaching a switching temperature, and which is configured to switch back from the geometric high-temperature configuration to the geometric low-temperature configuration upon subsequently reaching a reset temperature that is lower than the switching temperature, wherein a switching of the temperature-dependent snap-action part from the geometric low-temperature configuration to the geometric high-temperature configuration moves the switching mechanism from the first switching position to the second switching position, thereby opening the switch, and wherein a closing lock is provided that prevents the switch once having opened from closing again by keeping the switching mechanism in its second switching position, wherein the closing lock comprises a locking element which comprises a shape-memory alloy and an opening through which the movable contact member protrudes, wherein the shape-memory alloy is configured to change a shape of the locking element upon reaching a locking element switching temperature from a first shape, in which the locking element does not activate the closing lock, to a second shape, in which the locking element activates the closing lock by exerting a force on a part of the switching mechanism, which force holds the switching mechanism in its second switching position.

The closing lock is activated upon reaching or exceeding a predefined temperature that in the present case is referred to as locking element switching temperature. As long as the locking element switching temperature is not reached or exceeded, the closing lock is not activated.

The closing lock particularly makes use of the temperature-dependent shape-memory effect (memory effect) of a shape-memory alloy. It comprises a locking element that is at least partly made of such a shape-memory alloy. This locking element comprises an opening through which a part of the switching mechanism protrudes.

In particular, the movable contact member of the switching mechanism protrudes through this opening and can move through the opening during the switching movement of the switch without colliding with the locking element. The shape of the opening can be varied, for example round or angular.

The temperature-dependent shape-memory effect of the shape-memory alloy of the locking element is preferably used as follows: As long as the locking element switching temperature is not exceeded, the locking element remains in its first shape. In this first shape, the locking element does not exert a force on the switching mechanism. Preferably, the locking element does not contact the switching mechanism at all as long as it is in its first shape. The switching function of the switching mechanism, which is particularly effected by the temperature-dependent snap-action part, is thus not impaired as long as the closing lock is not activated. The closing lock is only activated when the locking element assumes its second shape, which happens due to the shape-memory alloy upon exceeding the locking element switching temperature. In its second shape, the locking element exerts a force on a part of the switching mechanism. This force holds the switching mechanism in its second switching position and prevents it from returning to its first, closed switching position.

As soon as the locking element switching temperature is reached, the switch thus remains in its second, open switching position. A renewed closing of the switch is prevented by the closing lock.

Shape-memory alloys allow such temperature-dependent changes in the shape of components to be guaranteed very easily and reliably. The locking element can therefore be produced relatively inexpensively. Since otherwise the design of the switch and of the switching mechanism contained therein does not have to be changed, but only the locking element has to be added to the switch, the realization of the entire closing lock is very simple and inexpensive from a production point of view. The total costs of the switch are therefore hardly increased by the closing lock.

It should be noted that the terms “open switch” and “closed switch” do not refer to a housing position, but to the electrically conductive connection. Thus, the terms have nothing to do with whether a housing of the switch is open or closed. Rather, these terms refer to whether the electrically conductive connection between the two stationary contacts of the switch is open/established or closed/disconnected.

With regard to the terminology used in the present case, it should also be noted that the shape of the shape-memory alloy of the locking element changes upon “exceeding” the locking element switching temperature. In principle, the change in shape already occurs when the locking element switching temperature is reached. However, the word “exceeding” is intended to clarify that the shape of the locking element changes after a warm-up process, i.e. when the locking element switching temperature is reached, starting from a lower temperature and not during a cooling process when the locking element switching temperature is reached, starting from a higher temperature.

The locking element can, for example, be configured to change its shape from the first shape to the second shape upon reaching the locking element switching during a warm-up process, but to retain its second shape upon reaching the locking element switching temperature later again during a cooling process.

The change in shape that the locking element performs when the locking element switching temperature is exceeded can be manifold. For example, the locking element can change its shape from a cross-sectionally flat or straight shape to a cross-sectionally convex or concave shape. It is also conceivable that the locking element bends, tilts or expands in one direction when the locking element switching temperature is reached.

Preferably, the shape-memory alloy of the locking element is configured to move the locking element towards the switching mechanism upon reaching the locking element switching temperature, to touch it and to exert a compressive force on it which force holds the switching mechanism in its second switching position. This force exerted by the locking element on the switching mechanism is preferably higher than the force exerted by the temperature-dependent snap-action part, by means of which the temperature-dependent snap-action part in its low-temperature configuration attempts to close the switch, i.e. to bring the switching mechanism into its first switching position.

If the switch is open after the switching temperature has been reached and the closing lock is activated after the locking element switching temperature has been reached, the closing lock prevents the switch from closing again, even if its temperature drops below the reset temperature again and the temperature-dependent snap-action part tries to snap back into its geometric low-temperature configuration.

According to a refinement, the locking element is substantially plate-shaped or disc-shaped.

This has the advantage that the locking element and thus the entire closing lock hardly increases the overall height of the switch. The dimensions of the switch as well as the design of the switching mechanism do not or hardly need to be adjusted compared to regular switches without closing lock.

Herein, “plate-shaped” and “disc-shaped” are understood to mean that the length and width extension of the locking element is considerably greater than its thickness. While “plate-shaped” can be almost any shape when viewed from above, “disc-shaped” preferably refers to a circular, oval or elliptical shape of the locking element.

According to another refinement, the opening in the locking element is configured as a through hole.

This has the advantage that such a hole can be produced relatively easily and inexpensively. The locking element can be produced as a kind of perforated plate, i.e. a plate with a through hole. Such a locking element can be mounted very easily in the housing of the switch and put over the movable contact member of the switching mechanism. Preferably, the opening or through-hole is centrally arranged in the locking element.

The locking element as well as the remaining design of the switch can, for example, be rotationally symmetrical.

In a further refinement, the locking element comprises at least one slit that penetrates the locking element and adjoins the opening.

The advantage of such a slit is that the shape-memory effect can be increased thereby. In other words, by means of the shape-memory alloy, the locking element can achieve a greater change in shape with the same amount of force. The at least one slit in the locking element also avoids internal stresses that could otherwise occur due to the deformation of the locking element caused by the shape-memory alloy.

The at least one slit may be rectilinear and may extend radially outward from the opening.

This has the advantage that the locking element can arch more. Parts of the locking element can unfold along the slit without producing any greater shear forces in the area of the opening.

The locking element may comprise two, three, four or more slits in the locking element, each of which adjoins the opening, is rectilinear and extends radially outward from the opening.

Hence, according to this refinement, the slits are inserted into the locking element in a star shape manner starting from the hole. Each of these slits preferably penetrates the entire thickness of the locking element. This has the advantage that the slits create individual, separate areas in the locking element which can bend separately upon reaching the locking element switching temperature in order to exert the force that is required for the closing lock on the switching mechanism separately from each other.

The locking element can be a kind of slotted spring disc or slotted disc spring, which is flat in its first shape, i.e. purely disc-shaped, and in its second shape is convex or concave curved.

In a further refinement, the switch comprises a housing and that the locking element is attached to the housing with its edge.

Since the opening is preferably centrally arranged in the locking element, such a peripheral attachment of the locking element has the advantage that the shape change caused by the shape-memory alloy is hardly affected. In addition, the locking element can be fixed at its edge to the housing in a very stable manner.

The locking element is preferably attached to the housing along its entire circumferential edge. The attachment can be in a non-positive locking manner, a positive locking manner and/or in a firmly bonded manner. The locking element is particularly preferably at its peripheral edge clamped in the housing. Such a fastening can be realized most cost-efficiently in terms of production.

The edge of the locking element may be made of an electrically insulating material or may be coated with an electrically insulating material.

For example, a central part of the locking element can be made of shape-memory alloy, which is connected to an electrically insulating material on its outer circumference. Similarly, the entire locking element can be made of the shape-memory alloy and coated on its peripheral edge with an electrically insulating material, e.g. plastic. Furthermore, an adhesive foil can be applied to the shape-memory alloy at the edge or along the circumference to electrically insulate the edge of the locking element. The coating or the adhesive foil can be applied to the locking element on one or both sides (top and bottom).

The electrical insulation of the edge of the locking element has the advantage that the locking element can be used to achieve an electrical insulation of two housing parts of the switch. Since the edge of the locking element is preferably attached to the housing and parts of the housing are current-carrying, such insulation also has the advantage that the locking element itself does not carry any current. This in turn has a positive effect on the function and lifetime of the shape-memory alloy.

According to another refinement, the housing comprises a lower part that is closed by an upper part, wherein the locking element rests on a circumferential shoulder that is arranged in the lower part and is arranged clamped between the lower part and the upper part.

Such an arrangement of the locking element has the advantage that it only has to be placed on the shoulder in the lower part during production and is automatically clamped between the upper part and the lower part during the closing of the switch housing and is thus fixed. Typically, the lower part has a raised edge which is at least partially bent or flanged to the upper part when the switch housing is closed in order to hold the upper part to the lower part.

Further, the first stationary contact or each of the two stationary contacts may be arranged on an inner side of the upper part.

This measure ensures that when the upper part is mounted on the lower part, the geometrically correct assignment between the first contact or the first and second contact to the movable contact member is also established at the same time.

In a further refinement, the locking element is arranged on a first side of the temperature-dependent snap-action part facing the first contact and is configured to exert in its second shape the force that holds the switching mechanism in its second switching position directly or indirectly on the temperature-dependent snap-action part.

Viewed from the temperature-dependent snap-action part, the locking element according to this refinement is thus arranged on the same side of the snap-action part as the first contact. As soon as the locking element assumes its second shape upon reaching the locking element switching temperature, it presses on the switching mechanism from this first side of the temperature-dependent snap-action part.

Depending on the design of the switching mechanism, the locking element can either contact the temperature-dependent snap-action part directly and apply the force directly to it or contact another component of the switching mechanism so that it applies the force only indirectly to the temperature-dependent snap-action part. Both cases have the advantage that both a direct application of force to the temperature-dependent snap-action part and a direct application of force to the temperature-independent spring part are possible without any problems, since both components are typically designed with a relatively large surface area and thus offer large-area possibilities for the application of force.

In an alternative refinement, the locking element is arranged on a second side of the temperature-dependent snap-action part facing away from the first contact and is configured to exert in its second shape the force that holds the switching mechanism in its second switching position directly or indirectly on the contact member.

Viewed from the temperature-dependent snap-action part, the locking element in this refinement is therefore not arranged on the side of the first contact (first side), but on the opposite second side of the temperature-dependent snap-action part. Upon reaching the locking element switching temperature it exerts the force that holds the switching mechanism in its second switching position preferably directly on the movable contact member. This has the advantage that the force exerted by the locking element is directly applied to the part that is to be kept apart from the first contact when the closing lock is activated. Since the movable contact member is usually a solid component, there is also hardly any risk of damage to the switching mechanism by the closing lock.

According to another refinement, the shape-memory alloy of the locking element is a shape-memory alloy with a one-way memory effect.

By using a shape-memory alloy with a one-way memory effect, the locking element and thus also the closing lock can be designed irreversibly. In this case, the switch according to the invention is a so-called one-time switch. The shape-memory alloy allows only one single change of shape of the locking element. After it has changed its shape from the first shape to the second shape upon exceeding the locking element switching temperature, cooling again in the case of such a shape-memory alloy with a one-way effect does not cause a renewed change in shape.

Alternatively, the shape-memory alloy can be a shape-memory alloy with two-way memory effect, wherein the locking element is configured to change its shape from the second shape to the first shape when falling below a locking element reset temperature, and wherein the locking element reset temperature is lower than the locking element switching temperature.

In this case, the switch is a switch with a closing lock that is reversibly designed, i.e. it can be released again. Shape-memory alloys with a two-way effect can, so to speak, remember two shapes, one at high and one at low temperature. With such a two-way shape-memory alloy, the locking element can change its shape from the first shape to the second shape upon reaching the locking element switching temperature, and then return to its first shape upon reaching the locking element return temperature during a subsequent cooling.

According to a further refinement, the locking element switching temperature is equal to or higher than the switching temperature of the temperature-dependent snap-action part.

If the two switching temperatures are selected to be the same, the closing lock is activated at the same time at which also the switch opens. If, on the other hand, the locking element switching temperature is selected to be higher than the switching temperature of the temperature-dependent snap-action part, the closing lock is activated after the switch has opened. In fact, the electric circuit is disconnected when the switch is opened. In practice, however, the switch usually heats up a little before the cooling process begins due to the residual heat typically remaining in the device to be protected. After opening the switch, the temperature slightly overshoots, which is why it is referred to as the overshoot temperature range. It is therefore possible to set the locking element switching temperature to be in this overshoot temperature range.

According to a further refinement, the locking element reset temperature is lower than the reset temperature of the temperature-dependent snap-action part.

This has the advantage that, if the switch cools down regularly after opening, the closing lock remains activated even if the temperature-dependent snap-action part reaches or falls below the reset temperature. A deactivation of the closing lock (if it is reversible) can then be carried out, for example, by means of a corresponding cold treatment. For example, the switch can be treated manually with a cooling spray, which deactivates the closing lock and closes the switch again.

According to a further refinement, the switching mechanism comprises a temperature-independent spring part which is connected to the movable contact member, wherein the temperature-dependent snap-action part acts on the temperature-independent spring part when the switching temperature is exceeded and thereby lifts off the movable contact member from the first contact. The spring part may be a bistable spring part with two temperature-independent, stable geometric configurations.

If the spring part is configured as a bistable spring disc, it is preferred that the spring disc in its first stable configuration presses the movable contact member against the first contact and in its second stable configuration keeps the movable contact member spaced apart from the first contact. This has the advantage that in the closed state of the switch (in the first switching position of the switching mechanism) the spring disc causes the closing force and thus the contact pressure between the movable contact member and the first contact. This mechanically relieves the temperature-dependent snap-action part, which has a positive effect on its service life and the long-term stability of its response temperature (switching temperature).

If the spring part is configured as a bistable spring disc having two temperature-independent stable geometric configurations, this has the additional advantage that the bistable spring disc keeps the switch in its open state after it has been opened.

The temperature-dependent snap-action part is preferably a bimetal or trimetal snap-action disc.

According to a further refinement, the movable contact member comprises a movable contact part interacting with the first contact, and that the spring part interacts with the second contact, wherein it is preferred that the spring part, at least in its first geometric configuration, is electrically connected to the second contact via its edge.

A similar refinement is disclosed in DE 10 2018 100 890 B3, DE 10 2007 042 188 B3 or DE 10 2013 101 392 A1. The result is that the temperature-dependent snap-action part is not current-loaded in any position of the switch, but that the load current of the electrical device to be protected flows through the spring part.

In an alternative refinement, the movable contact member comprises a current transfer member that interacts with both stationary contacts.

Here it is advantageous that the switch can carry considerably higher currents than the switch disclosed in DE 10 2007 042 188 B3. The current transfer member arranged on the contact member ensures the electrical short circuit between the two contacts when the switch is closed, so that not only the temperature-dependent snap-action part but also the temperature-independent spring part is no longer traversed by the load current. A switch having such a current transfer member is disclosed in DE 10 2013 101 392 A1.

It goes without saying that the features referred to above and yet to be explained below can be used not only in the respective given combinations, but also in other combinations or alone without leaving the spirit and scope of this disclosure.

DESCRIPTION OF PREFERRED EMBODIMENTS

Figure 1:
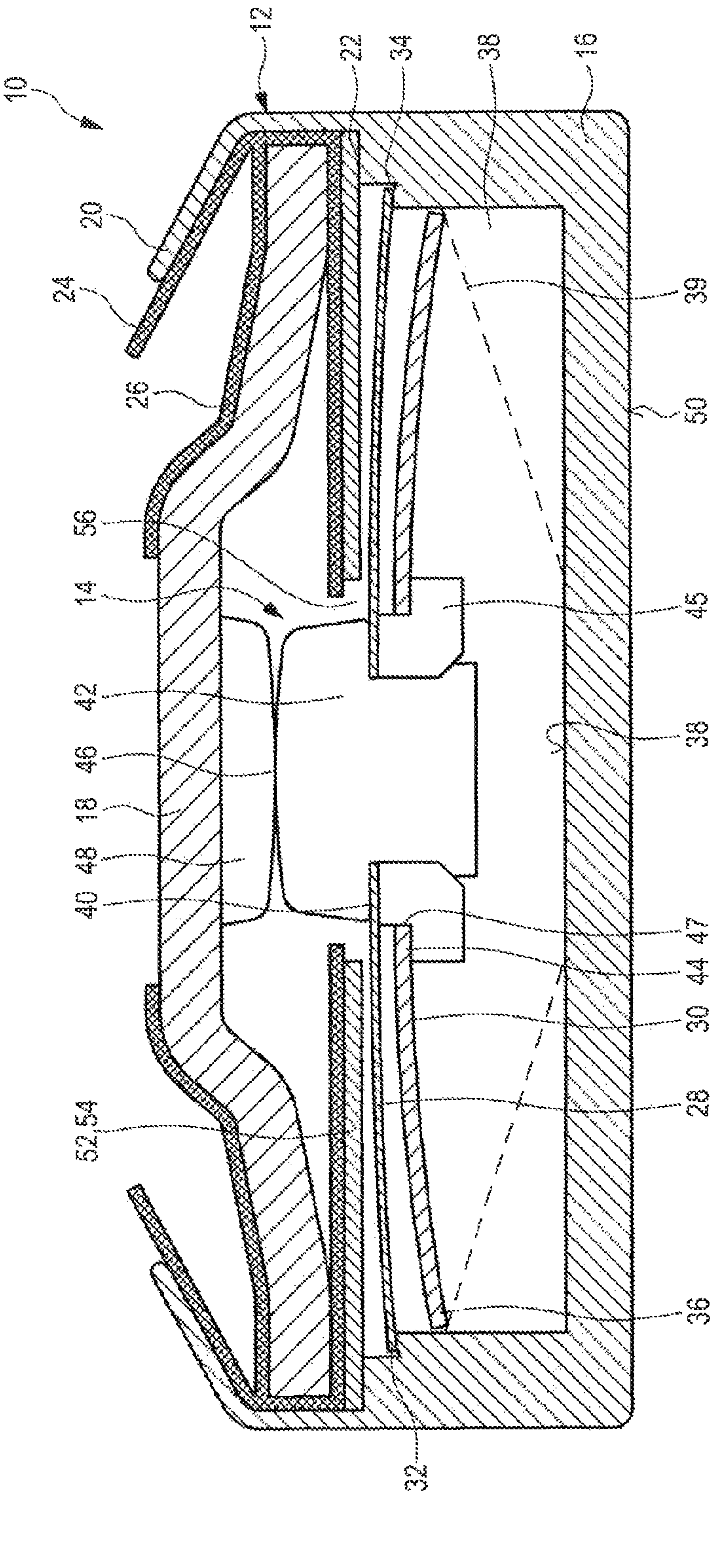
FIG. 1 shows a schematic sectional view of a first embodiment of the switch in its low-temperature position.

FIG. 1 shows a schematic sectional view of a switch 10, which is rotationally symmetrical in top view and preferably has a circular shape.

The switch 10 comprises a housing 12 in which a temperature-dependent switching mechanism 14 is arranged. The housing 12 comprises a pot-shaped lower part 16 and an upper part 18, which is held to the lower part 16 by a bent or flanged upper edge 20.

In the embodiment shown in FIG. 1, both the lower part 16 and the upper part 18 are made of an electrically conductive material, preferably metal. The upper part 18 rests on a shoulder 22 of the lower part with an interposed insulating foil 24. The shoulder 22 is designed as a circumferential shoulder and comprises a substantially annular bearing surface on which the upper part 18 rests with the interposed insulating foil 24.

The insulating foil 24 provides electrical insulation of the upper part 18 against the lower part 16. The insulating foil 24 also provides a mechanical seal that prevents liquids or impurities from entering the interior of the housing from outside.

Since the lower part 16 and the upper part 18 are in this embodiment each made of electrically conductive material, thermal contact to an electrical device to be protected can be produced via their outer surfaces. The outer surfaces are also used for the external electrical connection of the switch 10.

Another insulating foil 26 can be applied to the outside of the upper part 18, as shown in FIG. 1.

The switching mechanism 14 comprises a temperature-independent spring part 28 and a temperature-dependent snap-action part 30. The spring part 28 is preferably designed as a bistable spring disc. Accordingly, it has two temperature-independent stable geometric configurations. The first configuration is shown in FIG. 1. The temperature-dependent snap-action part 30 is preferably designed as a bimetal snap-action disc. It has two temperature-dependent configurations, a geometrical high-temperature configuration and a geometrical low-temperature configuration. In the first switching position of the switching mechanism 14 shown in FIG. 1, the temperature-dependent bimetal snap-action disc 30 is in its geometrical low-temperature configuration.

The temperature-independent spring disc 28 rests with its edge 32 on a further circumferential shoulder 34 formed in the lower part 16. In its low-temperature configuration, the temperature-dependent bimetal snap-action disc 30 can be freely suspended in the housing 12 in such a way that its edge 36 does not contact the housing 12. Among other things, this has the advantage that the closing pressure in the closed state of the switch 10 is generated by the spring disc 28 alone. Also, when the switch 10 is closed, the current then flows only through the spring disc 28, but not through the bimetal snap-action disc 30.

The edge 36 of the bimetal snap-action disc 30 in its low-temperature configuration can alternatively rest on the inner bottom surface 38 of the lower part 16. For this purpose, the inner bottom surface 38 may be laterally raised, as indicated by the dotted line 39 in FIG. 1. In such a case, the closing pressure of the switch 10 in its closed state would be generated not only by the spring disc 28 but also by the bimetal snap-action disc 30.

The temperature-independent spring disc 28 is with its center 40 fixed to a movable contact member 42 of the switching mechanism 14. The temperature-dependent bimetal snap-action disc 30 is with its center 44 also fixed to this movable contact member 42.

The movable contact member 42 comprises a contact part 46 and a ring 45 which is pressed onto the contact part 46. The ring 45 comprises a circumferential shoulder 47 on which the bimetal snap-action disc 30 rests with its center 44. The spring disc 28 is clamped between the ring 45 and the upper, widened section of the contact part 46. In this way, the temperature-dependent switching mechanism 14 is a captive unit consisting of contact member 42, spring disc 28 and bimetal snap-action disc 30. When mounting the switch 10, the switching mechanism 14 can thus be inserted as a unit directly into the lower part 16.

The contact part 46 of the movable contact member 42 interacts with a fixed counter contact 48, which is arranged inside the upper part 18. This counter contact 48 is herein also referred to as the first stationary contact. The outside of the lower part 16 serves as the second stationary contact 50.

In the position shown in FIG. 1, the switch 10 is in its low-temperature position, in which the spring disc 28 is in its initial configuration and the bimetal snap-action disc 30 is in its low-temperature configuration. The spring disc 28 presses the movable contact member 42 against the first stationary contact 48.

In the closed low-temperature position of the switch 10 as shown in FIG. 1, an electrically conductive connection is thus established between the first stationary contact 48 and the second stationary contact 50 via the movable contact member 42 and the spring disc 28.

Figure 2:
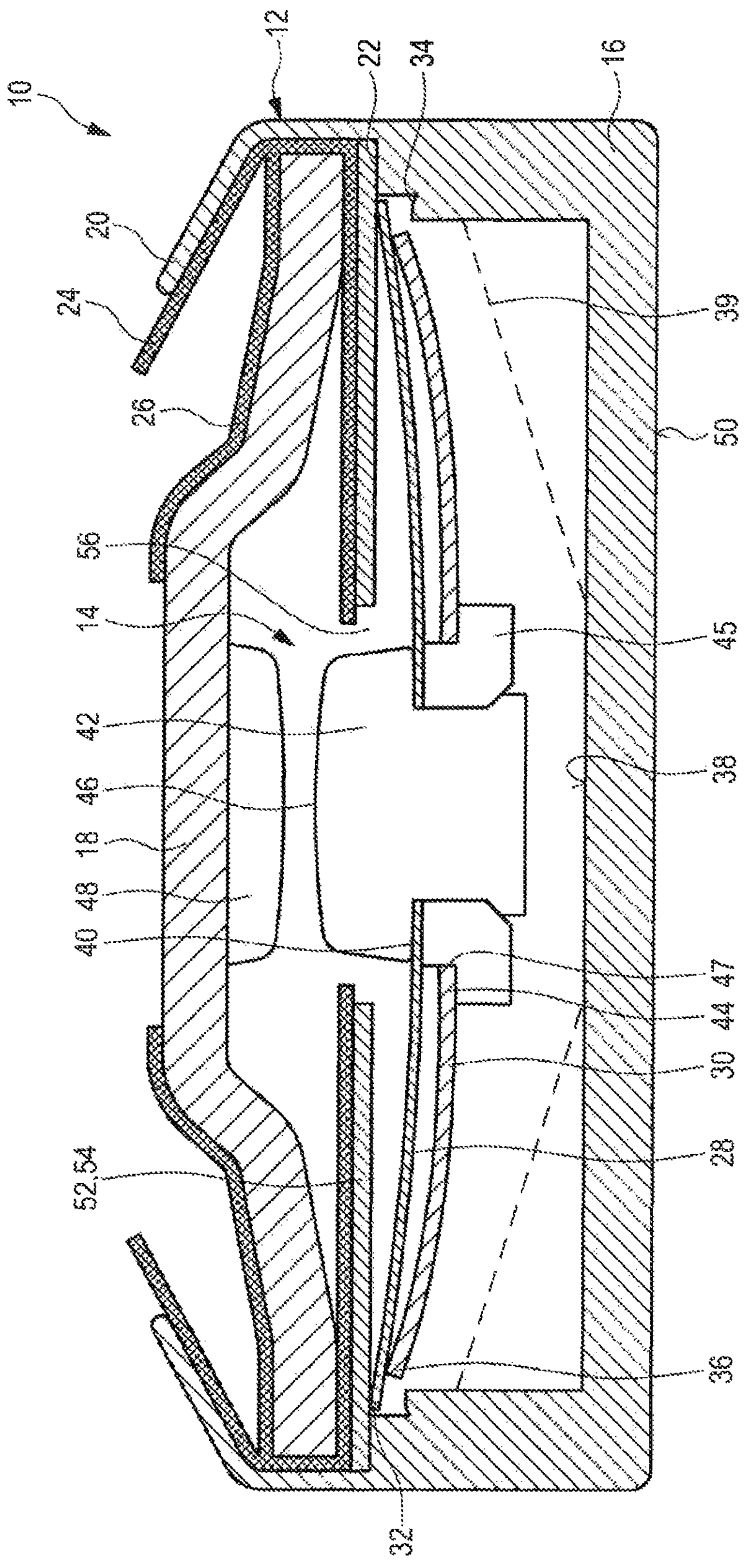
FIG. 2 shows a schematic sectional view of the first embodiment of the switch shown in FIG. 1 in its high-temperature position.

If the temperature of the device to be protected, and thus the temperature of the switch 10 and the temperature-dependent bimetal snap-action disc 30 arranged therein now increases, the snap-action disc will switch from the low-temperature configuration shown in FIG. 1 to its concave high-temperature configuration shown in FIG. 2. When this snap-action occurs, the edge 36 of the bimetal snap-action disc 30 is supported by a part of the switch 10, in this case by the edge 32 of the spring disc 28. Thereby, the snap-action disc 30 pulls with its center 44 the movable contact member 42 downwards and lifts off the movable contact member 46 from the first stationary contact 48. At the same time, it bends the temperature-independent spring disc 28 downwards at its center 40 so that the spring disc 28 switches from its first stable geometric configuration shown in FIG. 1 to its second stable geometric configuration shown in FIG. 2. FIG. 2 thus shows the high-temperature position of the switch 10 in which it is open. The electric circuit is thus disconnected.

If the device to be protected and thus the switch 10 together with the temperature-dependent bimetal snap-action disc 30 then cool down again, the bimetal snap-action disc 30, upon reaching its reset temperature, would actually snap back to its low-temperature configuration as shown in FIG. 1. Then the bimetal snap-action disc 30 would actually move the spring disc 28 back to its first configuration as shown in FIG. 1 and thus close the switch again. However, with the switch 10 as shown in FIG. 1, this reset process can be prevented by a closing lock 52.

The closing lock 52 comprises a locking element 54, which is substantially plate-shaped or disc-shaped. In the first embodiment shown in FIGS. 1-3, this locking element 54 is clamped between the lower part 16 and the upper part 18. More precisely, the locking element 54 is clamped between the circumferential shoulder 22 and the insulating foil 24. In addition to this clamping arrangement, the locking element 54 can also be firmly bonded to the lower part 16 (e.g. glued, welded or soldered).

Figure 8:
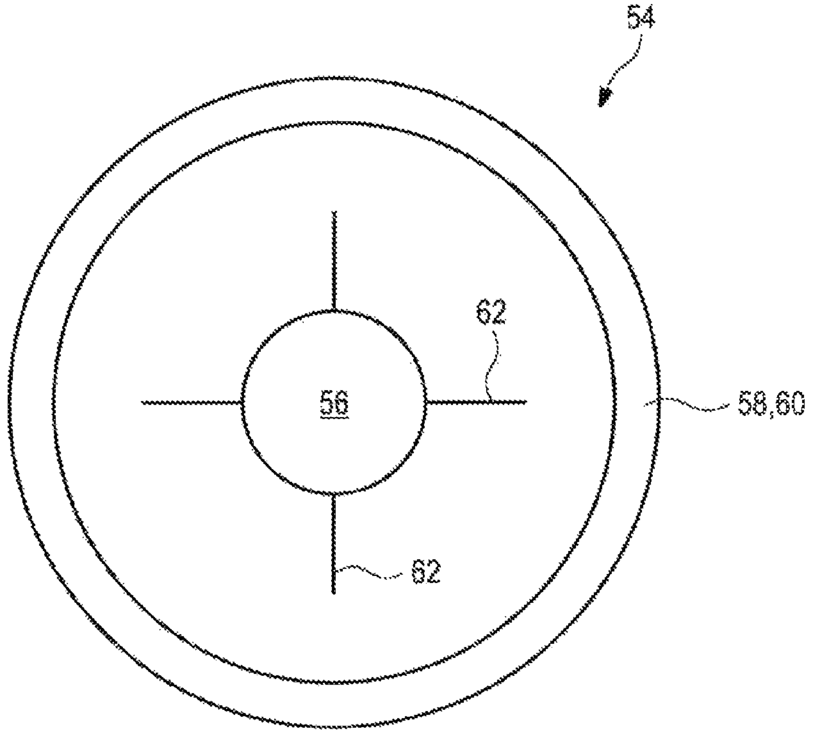
FIG. 8 shows a schematic top view of a locking element according to an embodiment.

An embodiment of the locking element 54 is shown in FIG. 8 in a schematic top view. At least a major part of the locking element 54 is made of a shape-memory alloy. This shape-memory alloy is configured to change the shape of the locking element 54 from a first shape to a second shape upon exceeding a predefined temperature, which is herein referred to as the locking element switching temperature. FIG. 8 shows the first shape of the locking element 54. This also corresponds to the shape of the locking element 54 indicated in FIGS. 1 and 2 in the schematic section, in which the closing lock 52 is not yet activated.

In its first shape, the locking element 54 has substantially the shape of a circular disc. It comprises an opening 56, which in the embodiment shown here is designed as a centrally arranged hole. The movable contact member 42 of the switching mechanism 14 protrudes through the opening 56 (see FIGS. 1-3). The opening 56 is therefore preferably dimensioned in such a way that the contact member 42 neither collides with the switching mechanism 14 in the first switching position of the switching mechanism 14 nor during its switching movement. It goes without saying that the opening 56 does not necessarily have to be a round hole, but can also have a different shape, e.g. oval, elliptical or angular.

The edge 58 of the locking element 54, with which it is attached to the housing 12, is preferably made of an electrically insulating material or coated with an electrically insulating material. This additionally improves the electrical insulation between the lower part 16 and the upper part 18. In addition, the stability of the clamping of the locking element 54 in the housing 12 can be increased.

For example, the base body of the locking element 54 can be made entirely of the shape-memory alloy, which is provided with an adhesive foil or plastic coating 60 at the edge 58. This adhesive foil or plastic coating 60 is preferably applied to both sides of the shape-memory alloy base body.

The locking element 54 shown in FIG. 8 further comprises four slits 62, which extend radially outward from the opening 56 in a star-shaped manner. The slits 62 extend through the entire thickness of the locking element 54. Hence, they are not only superficially inserted into the locking element 54, but cut completely through it. Starting from the central opening 56, they run radially outward, but end before the outer edge 58 of the locking element 54.

Figure 3:
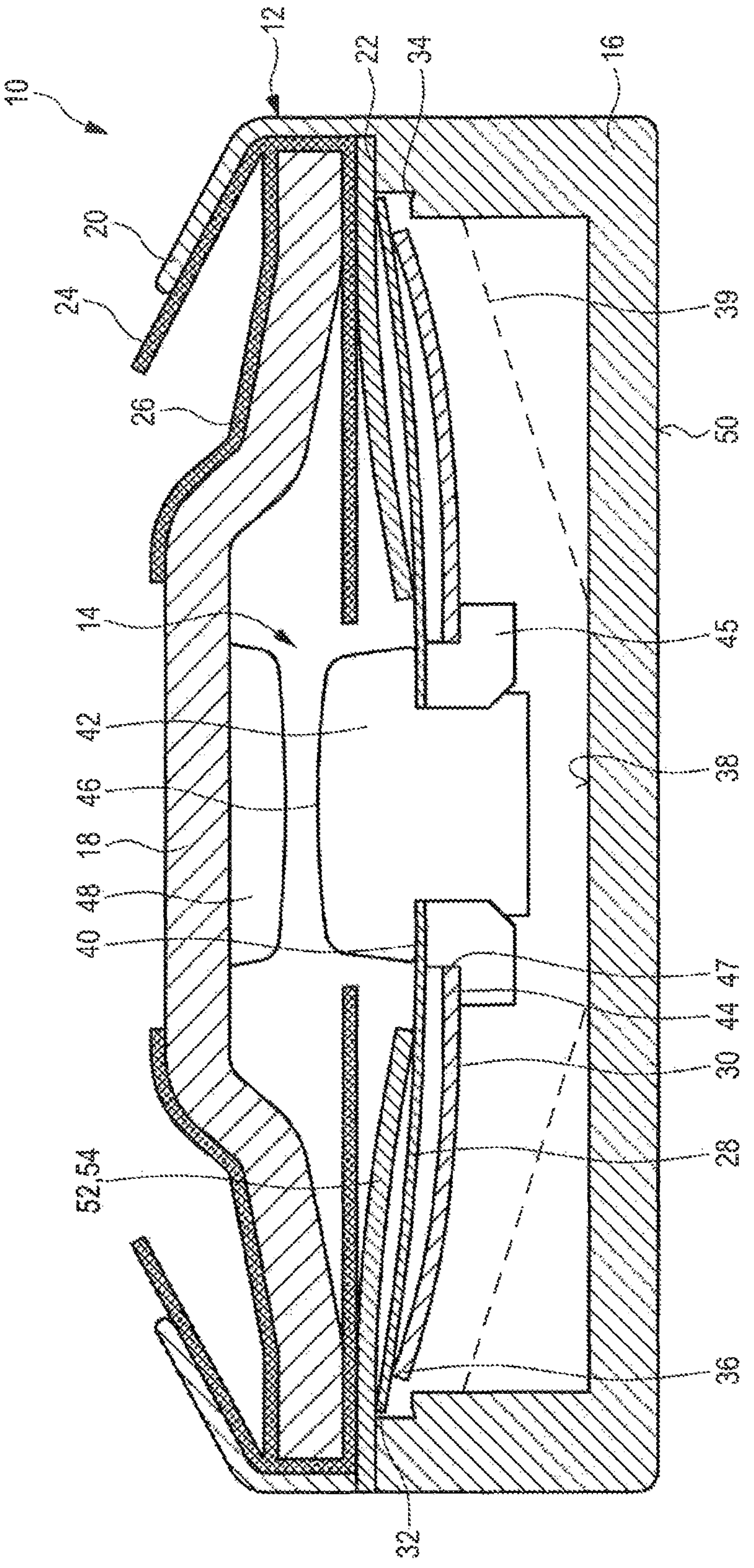
FIG. 3 shows a schematic sectional view of the first embodiment of the switch shown in FIG. 1 in its high-temperature position with activated closing lock.

The slits 62 allow a kind of unfolding of the locking element 54 when the shape-memory alloy brings the locking element 54 into its second shape upon reaching the locking element switching temperature. The four sectors of the locking element 54 that are separated by the slits 62 then fold down as shown in FIG. 3. The individual sectors of the locking element 54 bend or bulge downwards.

In FIG. 3 the curvature of the locking element 54 in its second shape is such that it may be convex on its upper side and concave on its lower side. Depending on the design of the shape-memory alloy, the curvature of the locking element 54 in its second shape can also be reversed so that its upper side is concave and its lower side is convex (similar to the two discs 28, 30 in FIG. 3).

In principle, such a temperature-related change in shape can also be achieved with a shape-memory alloy locking element without slits 62 or with fewer slits 62. Slit 62, however, helps to reduce internal stresses caused by the deformation of the locking element 54. In addition, the shape change of the locking element 54 can be increased.

In the first embodiment shown in FIG. 1-3, the following interaction between the switching mechanism 14 and the closing lock 52 or the associated locking element 54 results: as long as the switching temperature of the bimetal snap-action disc 30 is not exceeded, the switch remains in its closed position as shown in FIG. 1. When the switching temperature is reached, the bimetal snap-action disc 30 snaps into its high temperature configuration as shown in FIG. 2 and lifts off the movable contact member 42 from the first stationary contact 48, thus opening the switch 10 and disconnecting the current flowing through the switch 10. The locking element switching temperature, i.e., the temperature at which the shape-memory alloy brings the locking element 54 to its second shape, is preferably selected to be slightly higher than the switching temperature of the bimetal snap-action disc 30. For example, the shape-memory alloy of the locking element 54 can be configured such that the locking element switching temperature is 5-40 K above the switching temperature of the bimetal snap-action disc 30. Hence, upon reaching the switching temperature, the locking element 54 initially remains in its first shape as shown in FIG. 2. The closing lock 52 is therefore not yet activated in the situation shown in FIG. 2.

If the temperature of the switch 10 and thus also the temperature of the locking element 54 now increases further, the shape-memory alloy causes the already mentioned shape change of the locking element 54 when the locking element switching temperature is reached, so that it assumes its second shape as shown in FIG. 3. In this second shape or configuration, the locking element 54 presses on the top of the spring disc 28 as shown in FIG. 3, causing the locking element 54 to exert a force on the switching mechanism 14 which acts directly on the spring disc 28 and indirectly on the movable contact member 42. This force keeps the switching mechanism 14 in its second switching position. The closing lock 52 is activated.

Even if the switch 10 now cools down again starting from the situation shown in FIG. 3, the switching mechanism 14 cannot be moved to its first switching position as long as the closing lock 52 is activated. If the switch 10 cools down below the reset temperature, the bimetal snap-action disc 30 would snap back into its low-temperature configuration as shown in FIG. 1. However, the switching mechanism 14 would still remain in its second switching position because the edge 36 of the bimetal snap-action disc 30 would snap into the void, so to speak, without being able to support itself on the housing 12.

Even if the inner bottom surface 38 is laterally raised, as indicated in FIG. 1-3 by the dotted line 39, the bimetal snap-action disc 30 in its low-temperature configuration could be supported with its edge on the housing 12. However, as long as the closing lock 52 is activated, the spring disc 28 would still be pressed down by the locking element 54, so that the movable contact member 42 would remain spaced apart from the first stationary contact 48 and the switch 10 would remain open.

In order to be able to effectively prevent an inadvertent closing of the switch 10 with the closing lock 52 activated, even if the bimetal snap-action disc 30 in its low-temperature configuration can rest on the housing 12, the spring constant of the locking element 54 is in such case preferably higher than the spring constant of the bimetal snap-action disc 30.

Depending on the design of the locking element 54, deactivation of the closing lock 52 is either not possible at all or is possible by a cold treatment.

In the first case of an irreversible closing lock 52, the switch 10 is a one-time switch. For this purpose, a shape-memory alloy with a one-way memory effect is selected for the locking element 54.

By using a shape-memory alloy with a two-way memory effect, the closing lock 52 can alternatively be configured to be reversible. In this case, the shape-memory alloy of the locking element 54 is configured to return the shape of the locking element 54 from the second shape shown in FIG. 3 to the first shape shown in FIGS. 1 and 2 when the temperature of the locking element falls below a locking element reset temperature. In this case the locking element 54 can, so to speak, remember both forms.

The shape-memory alloy of the locking element 54 is preferably configured such that the locking element reset temperature is lower than the reset temperature of the bimetal snap-action disc 30. For example, the shape-memory alloy of the locking element 54 can be configured such that the locking element reset temperature is lower than room temperature and, for example, set to be in a temperature range of 0-15° C. By means of a cold treatment, the closing lock 52 can thus be released again so that the switch 10 would return from the switching position shown schematically in FIG. 3 to the switching position shown schematically in FIG. 1.

Figure 4:
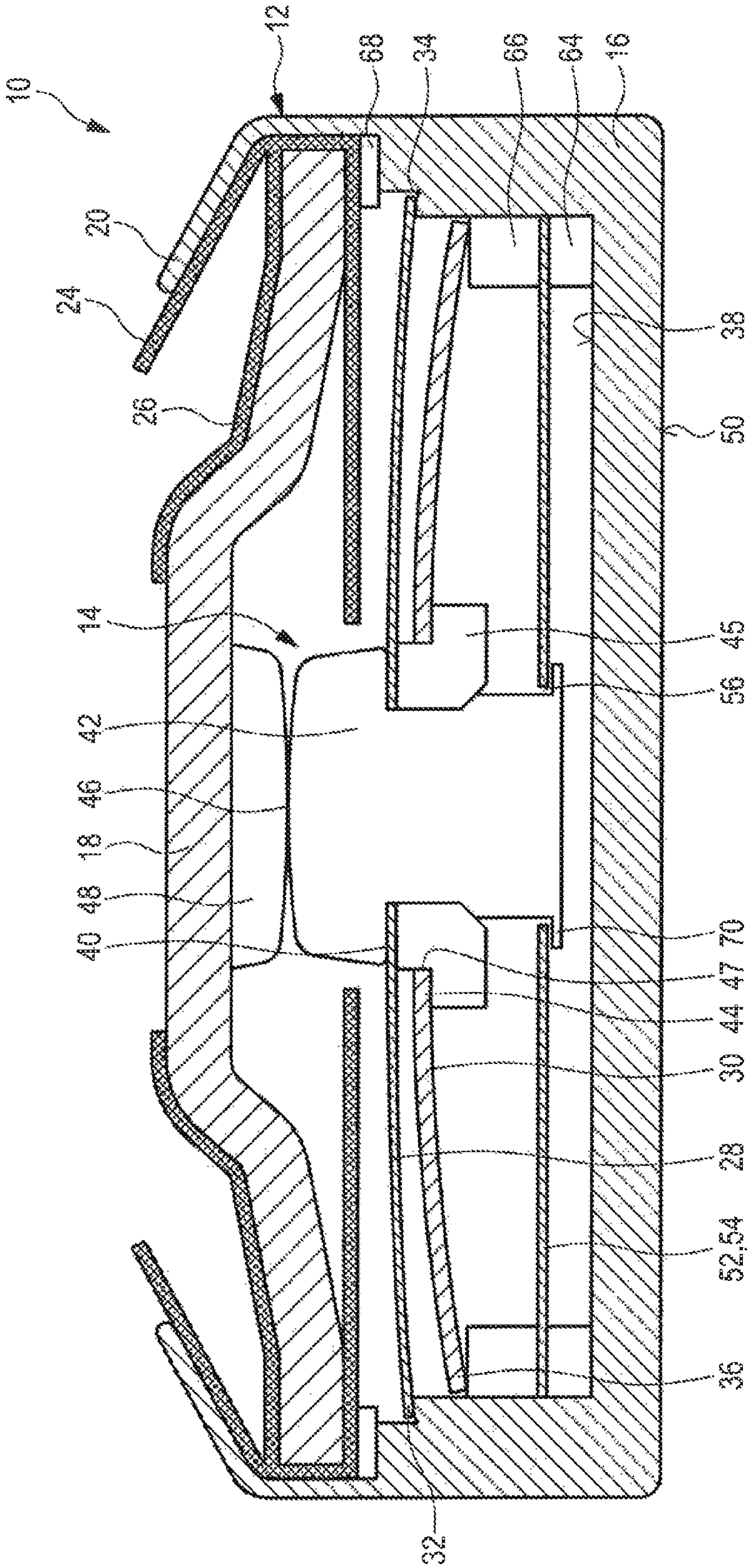
FIG. 4 shows a schematic sectional view of a second embodiment of the switch in its low-temperature position.
Figure 5:
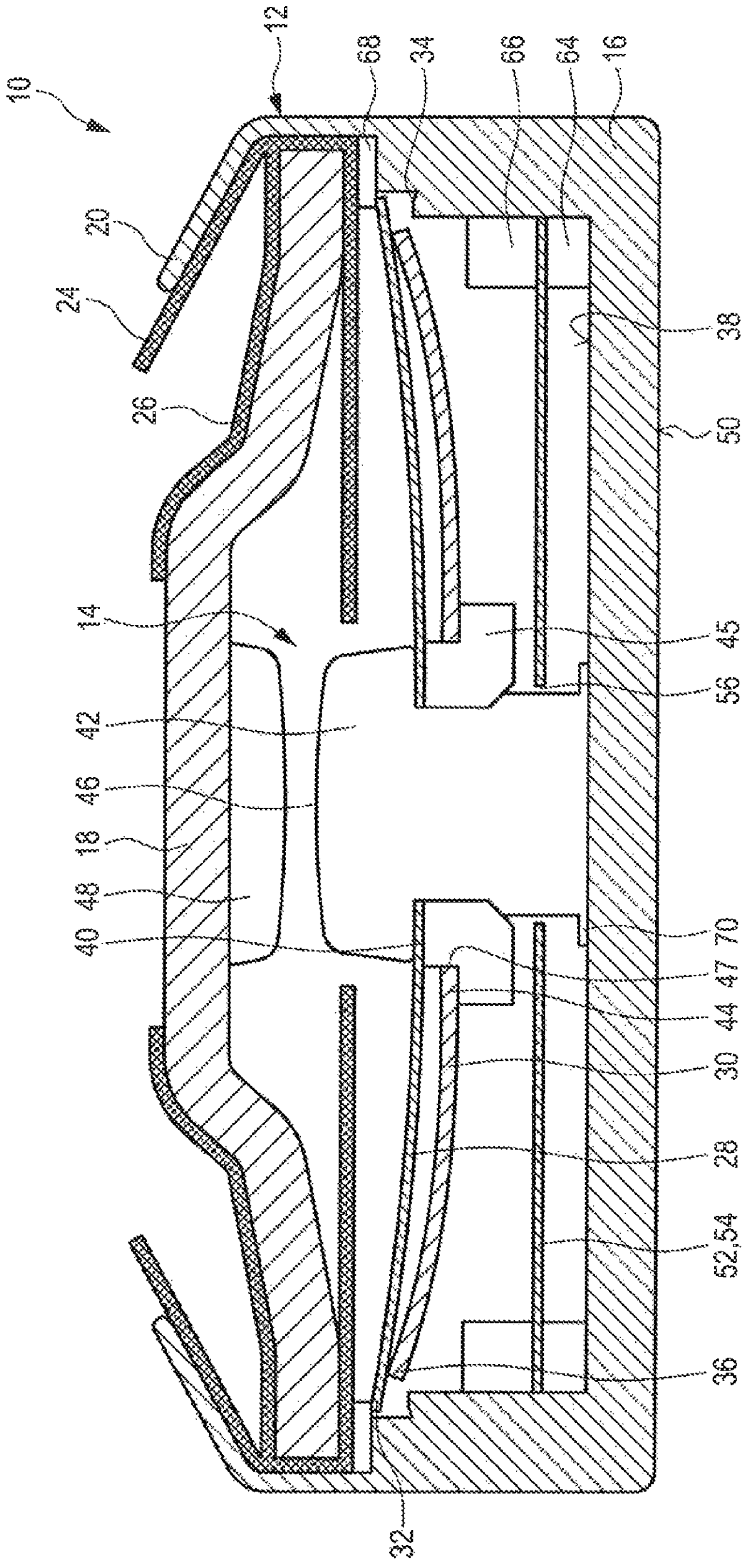
FIG. 5 shows a schematic sectional view of the second embodiment of the switch shown in FIG. 4 in its high-temperature position.
Figure 6:
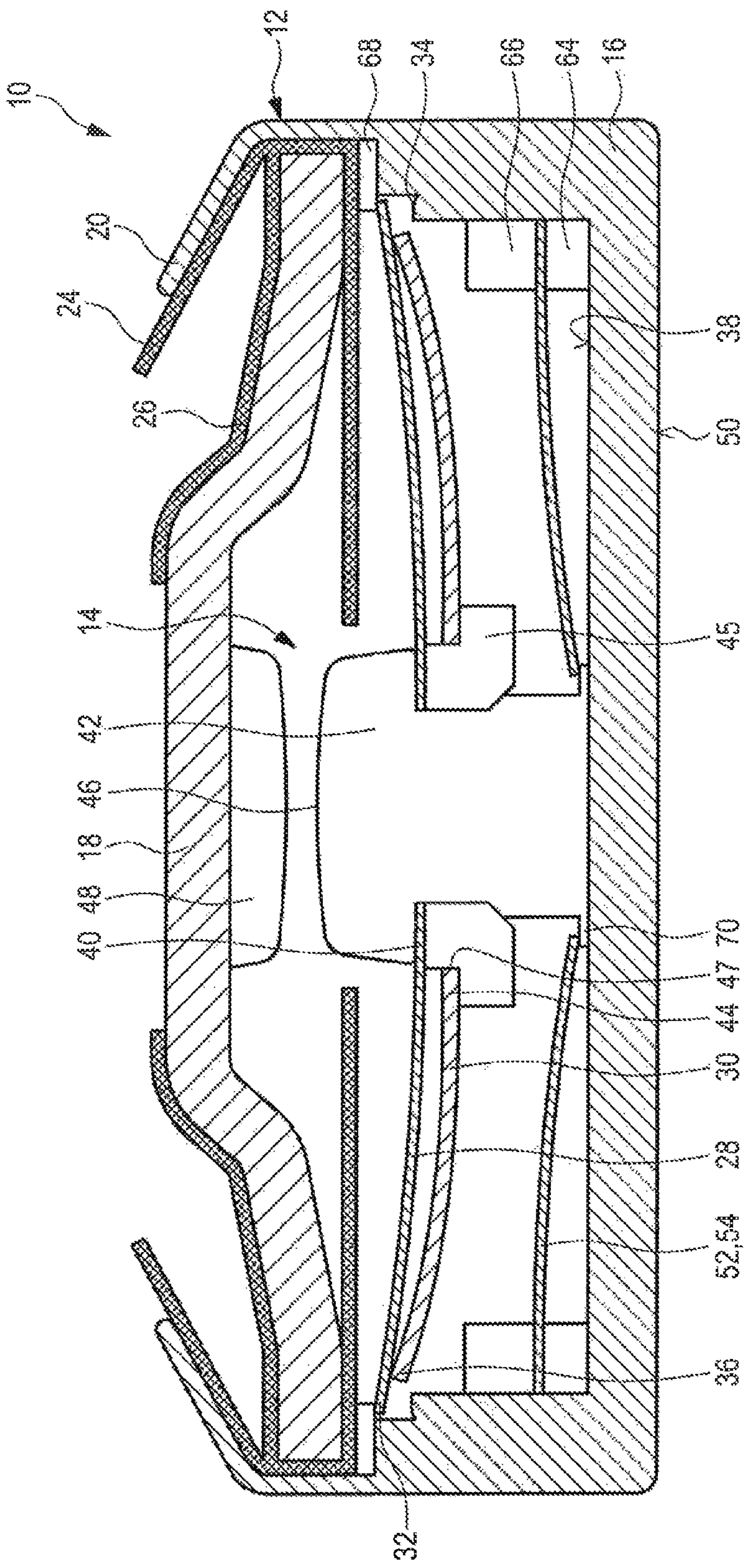
FIG. 6 shows a schematic sectional view of the second embodiment of the switch shown in FIG. 4 in its high-temperature position with activated closing lock.

FIGS. 4-6 show a second embodiment of the switch 10. FIG. 4 shows, similar to FIG. 1 above, the switch 10 in its closed position, in which the switching mechanism 14 is in its first switching position, the bimetal snap-action disc 30 is in its low-temperature configuration and the closing lock 52 is not activated. FIG. 5 shows, similar to FIG. 2 above, the switch 10 in its open position, in which the switching mechanism 14 is in its second switching position, the bimetal snap-action disc 30 is in its high-temperature configuration and the closing lock 52 is not activated. FIG. 6 shows, similar to FIG. 3, the switch 10 in its open position, in which the switching mechanism 14 is still in its second switching position, but the closing lock 52 is activated.

The switching function as well as the interaction between the switching mechanism 14 and the closing lock 52 in the second embodiment shown in FIGS. 4-6 is the same as mentioned above with regard to the first embodiment shown in FIGS. 1-3.

In contrast to the first embodiment, the locking element 54 of the closing lock 52 in the second embodiment shown in FIGS. 4-6 is arranged on the opposite side of the switching mechanism 14. While the locking element 54 of the first embodiment of the switch 10 shown in FIGS. 1-3 is arranged on the upper side of the switching mechanism 14 facing the first contact 48, the locking element 54 of the second embodiment of the switch 10 shown in FIGS. 4-6 is arranged on the lower side of the switching mechanism 14 facing away from the first contact 48.

The locking element 54 is clamped between two spacer rings 64, 66. The first spacer ring 64 is arranged on the inner bottom surface 38 of the lower part 16. The locking element 54 rests on this first spacer ring 64. The second spacer ring 66 is arranged on the locking element 54. The bimetal snap-action disc 30 rests with its edge 36 on the upper side of the second spacer ring 66.

A further spacer ring 68 is arranged at the position where the locking element 54 was arranged between the lower part 16 and the upper part 18 according to the first embodiment. This spacer ring 68 serves as a spacer between the lower part 16 and the upper part 18. Furthermore, the spring disc 28 can be supported from below by this spacer ring 68 when the switching mechanism 14 is in its second switching position (see FIGS. 5 and 6).

In the second embodiment of the switch 10 shown in FIGS. 4-6, the movable contact member 42 is further designed slightly differently. In the area of its lower end, it comprises a laterally protruding socket 70 whose diameter is slightly larger than the diameter of the opening 56 provided in the locking element 54. The movable contact member 42 protrudes through the opening 56 provided in the locking element 54. The widened socket 70 is arranged below the locking element 54.

The locking element 54 is designed in the same way as mentioned above with regard to the first embodiment shown in FIGS. 1-3 (see FIG. 8). However, in its second shape, which it assumes after reaching the locking element switching temperature, the locking element 54 now directly engages the movable contact member 42. As shown in FIG. 6, the locking element 54 presses the widened base 70 from above, thus keeping the movable contact member 42 spaced apart from the first stationary contact 48. Thus, also in this embodiment, it is not possible to close the switch 10 again as long as the closing lock 52 is activated.

Also in this embodiment, the closing lock 52 can be designed reversibly or irreversibly, depending on whether a shape-memory alloy with a one-way memory effect or a shape-memory alloy with a two-way memory effect is used for the shape-memory alloy of the locking element 54.

Figure 7:
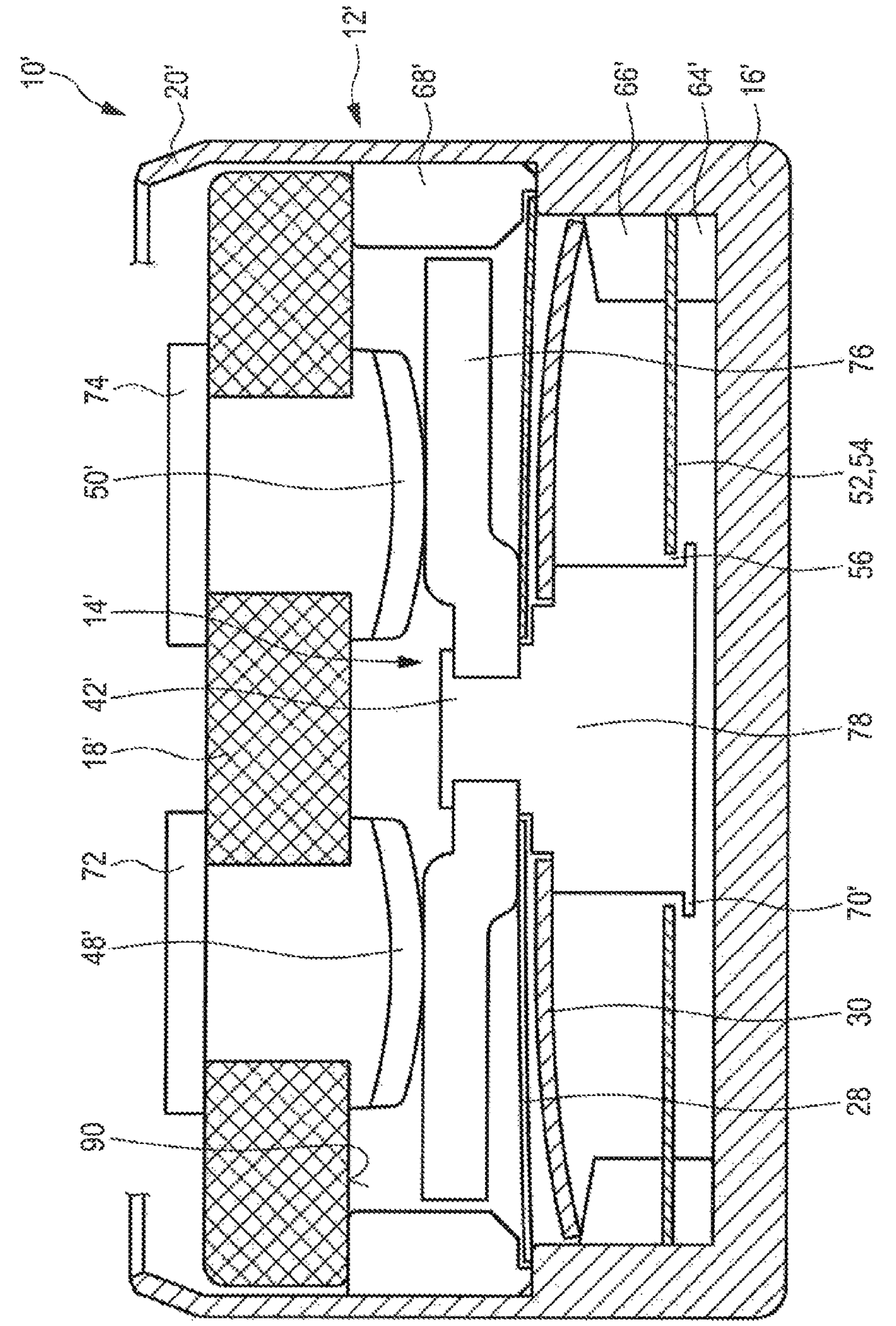
FIG. 7 shows a schematic sectional view of a third embodiment of the switch in its low-temperature position.

FIG. 7 shows a third embodiment of the switch 10'. The closing lock 52 is designed in the same way as switch 10 shown in FIGS. 4-6.

Since the interaction between the switching mechanism 14' and the closing lock 52 is realized in the same way as mentioned before with the switch 10' shown in FIG. 7, this will not be discussed again explicitly at this point. Likewise, the switch 10' is only shown in its closed position, in which the switching mechanism 14' is in its first switching position.

The design of the switch 10' shown in FIG. 7 is slightly different from the design of the switch 10 according to the first two embodiments shown in FIG. 1-6.

The lower part 16' is again made of electrically conductive material. The flat upper part 18' is made of electrically insulating material. It is held to the lower part 16' by the bent edge 20'.

A spacer ring 68' is provided between the upper part 18' and the lower part 16' to keep the upper part 18' at a distance from the lower part 16'. On its inside, the upper part 18' comprises a first stationary contact 48' and a second stationary contact 50'. The contacts 48' and 50' are designed as rivets which extend through the upper part 18' and end outside in the heads 72, 74 which serve for the external connection of the switch 10'.

The movable contact member 42' here comprises a current transfer member which is designed as a contact plate, the upper side of which is coated with an electrically conductive coating so that the current transfer member 76, in the closed position of the switch 10 shown in FIG. 7, rests on the contacts 48', 50' and provides an electrically conductive connection between the contacts 48' and 50'. The current transfer member 76 is connected to the spring disc 28 and the bimetal snap-action disc 30 via a rivet 78, which is also to be regarded as part of the contact member 42'. Upon exceeding the switching temperature, the bimetal snap-action disc 30 of the switching mechanism 14' ensures, similar to the previous one, that the switching mechanism 14' is moved to its second switching position, in which the current transfer member 76 is kept spaced apart from the two contacts 48', 50' and the circuit is thus disconnected.

A difference of the switch design shown in FIG. 7 is that, in contrast to the embodiment of the switch 10 shown in FIGS. 1-6, no current flows through either the spring disc 28 or the bimetal snap-action disc 30 when switch 10 is closed. When the switch 10' is closed, current flows only from the first external connection 72 via the first contact 48', the current transfer member 76 and the second contact 50' to the second external connection 74.

The locking element 54 of the closing lock 52 engages the rivet 78 as soon as the closing lock 52 is activated, i.e. as soon as the temperature of the switch 10' and thus the temperature of the locking element 54 exceeds the locking element switching temperature. Similar to the second embodiment shown in FIGS. 4-6, the rivet 78 is provided with a widened base 70 at its lower end. At this base 70, the locking element 54 engages to press down the rivet 78 and thus the entire movable contact member 42' and to hold the switching mechanism 14' in its second switching position as soon as the closing lock 52 is activated.

In principle, the closing lock 52 can also be designed for the switch 10', as shown schematically in FIG. 7, in the same way as the first embodiment of the switch 10 shown in FIGS. 1-3.

A reversible design of the closing lock 52 is also possible with the third embodiment of the switch 10' shown in FIG. 7.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A temperature-dependent switch, comprising a first stationary contact, a second stationary contact, and a temperature-dependent switching mechanism having a movable contact member, wherein the first stationary contact is arranged on a first side of the temperature-dependent snap action part, wherein in a first switching position, the temperature-dependent switching mechanism presses the movable contact member against the first stationary contact, thereby producing an electrically conductive connection between the first stationary contact and the second stationary contact via the movable contact member, and, in a second switching position, the temperature-dependent switching mechanism keeps the movable contact member spaced at a distance from the first stationary contact, thereby disconnecting the electrically conductive connection, wherein the temperature-dependent switching mechanism comprises a temperature-dependent snap-action part, which is configured to switch from a geometric low-temperature configuration to a geometric high-temperature configuration upon reaching a switching temperature, and which is configured to switch back from the geometric high-temperature configuration to the geometric low-temperature configuration upon subsequently reaching a reset temperature that is lower than the switching temperature, wherein a switching of the temperature-dependent snap-action part from the geometric low-temperature configuration to the geometric high-temperature configuration moves the temperature-dependent switching mechanism from the first switching position to the second switching position, thereby opening the temperature-dependent switch, wherein a closing lock is provided that, as soon as it is activated, prevents the temperature-dependent switch once having opened from closing again by keeping the temperature-dependent switching mechanism in the second switching position, wherein the closing lock comprises a locking element which comprises a shape-memory alloy and an opening through which the movable contact member protrudes, wherein the shape-memory alloy is configured to change a shape of the locking element upon reaching a locking element switching temperature from a first shape, in which the locking element does not activate the closing lock, to a second shape, in which the locking element activates the closing lock by exerting a force on a part of the temperature-dependent switching mechanism, the force holds the temperature-dependent switching mechanism in the second switching position, wherein the locking element is arranged on a second side of the temperature-dependent snap-action part facing away from the first stationary contact and is configured to exert in its second shape the force directly or indirectly on the movable contact member, wherein the movable contact member comprises a laterally protruding shoulder having a diameter that is larger than a diameter of the opening of the locking element, and wherein the locking element is arranged between the temperature-dependent snap-action part and the laterally protruding shoulder.

2. The temperature-dependent switch according to claim 1, wherein the locking element is plate-shaped or disc-shaped.

3. The temperature-dependent switch according to claim 1, wherein the opening comprises a through hole.

4. The temperature-dependent switch according to claim 1, wherein the opening is arranged centrally in the locking element.

5. The temperature-dependent switch according to claim 1, wherein the locking element comprises at least one slit that adjoins the opening.

6. The temperature-dependent switch according to claim 5, wherein the at least one slit is rectilinear and extends radially outward from the opening.

7. The temperature-dependent switch according to claim 1, wherein the locking element comprises at least three slits, each of which adjoins the opening, is rectilinear and extends radially outward from the opening.

8. The temperature-dependent switch according to claim 1, wherein the shape-memory alloy is a shape-memory alloy with a one-way memory effect.

9. The temperature-dependent switch according to claim 1, wherein the shape-memory alloy is a shape-memory alloy with a two-way memory effect, and wherein the locking element is configured to change its shape from the second shape to the first shape when falling below a locking element reset temperature that is lower than the locking element switching temperature.

10. The temperature-dependent switch according to claim 1, wherein the locking element switching temperature is equal to or higher than the switching temperature of the temperature-dependent snap-action part.

11. The temperature-dependent switch according to claim 9, wherein the locking element reset temperature is lower than the reset temperature of the temperature-dependent snap-action part.

12. The temperature-dependent switch according to claim 1, wherein the temperature-dependent switching mechanism comprises a temperature-independent spring part which is connected to the movable contact member, wherein the temperature-dependent snap-action part acts on the temperature-independent spring part upon reaching the switching temperature and thereby lifts off the movable contact member from the first stationary contact.

13. The temperature-dependent switch according to claim 1, wherein the temperature-dependent snap-action part is a bimetal or trimetal snap-action disc.

14. The temperature-dependent switch according to claim 12, wherein the movable contact member comprises a movable contact part that is configured to interact with the first stationary contact, and wherein the temperature-independent spring part is configured to interact with the second stationary contact.

* * * * *